United States Patent [19]

Gobeli et al.

[11] 3,927,677

[45] Dec. 23, 1975

[54] DEMAND CARDIAC PACER

[75] Inventors: David H. Gobeli, St. Paul; John M. Adams, Minneapolis, both of Minn.

[73] Assignee: Medtronic, Inc., Minneapolis, Minn.

[22] Filed: July 12, 1974

[21] Appl. No.: 488,045

[52] U.S. Cl. ..................... 128/419 PG; 128/2.06 R
[51] Int. Cl.² ........................................ A61N 1/36
[58] Field of Search ..... 128/2.06 A, 2.06 F, 2.06 R, 128/419 P, 421, 422

[56] References Cited
UNITED STATES PATENTS

| | | | |
|---|---|---|---|
| 3,174,478 | 3/1965 | Kahn | 128/2.06 R |
| 3,520,295 | 7/1970 | Kelly | 128/2.06 R |
| 3,547,127 | 12/1970 | Anderson | 128/419 PG |

Primary Examiner—William E. Kamm
Attorney, Agent, or Firm—Lew Schwartz; Wayne A. Sivertson

[57] ABSTRACT

A demand cardiac pacer of the type having a resettable pulse generator and electrode means adapted to be connected to the heart for sensing heart activity. The pacer is provided interference discrimination circuitry including a rectifier section responsive to the repetition rate and amplitude of the signals sensed by the electrodes for establishing a reference level representative of sensed extraneous repetitive noise and a second level representative of sensed heart activity. A detector section of the interference discrimination circuitry responds to a difference between the reference level and second level to generate a signal indicative of the sensing of heart activity when that difference exceeds a predetermined value. In a preferred embodiment, the rectifier and detector sections of the interference discrimination circuitry include differential amplifiers, the rectifying differential amplifier acting to control the charge on a capacitor with the capacitor charge establishing both the reference and second levels. The signal indicating the sensing of heart activity triggers a reset signal generator which is provided with a refractory period to limit the repetition rate of the reset signals.

15 Claims, 3 Drawing Figures

DEMAND CARDIAC PACER

BACKGROUND OF THE INVENTION

Demand cardiac pacers are well known to those familiar with the art. Such pacers provide a heart stimulating pulse to the patient's heart only in the absence of a natural heartbeat. If only a single natural heartbeat is absent, only a single stimulating pulse will be provided. If more than one natural heartbeat is missing, an equal number of stimulating pulses will be provided.

Typical demand cardiac pacers generate stimulating pulses at time intervals approximating the rate of natural heartbeats. Upon detection of a natural heartbeat, the next stimulating pulse which would otherwise be generated is inhibited. Upon the inhibiting of the stimulating pulse, the timing cycle of the pacer is restarted so that the next stimulating pulse will be generated (if needed) at approximately at the same time as an expected natural heartbeat. The generation of a stimulating pulse restarts the timing cycle of the pacer so that no matter how many stimulating pulses are generated, they occur at essentially the same time spacing from each other and from a natural heartbeat as would be the case as if they were all heartbeats.

In practice, it has been found that other signals can inhibit the generation of stimulating pulse just as a natural heartbeat. For example, strong electrical signals commonly encountered in the environment, such as stray 60 Hz energy, may result in the inhibiting of a stimulating pulse as if a natural heartbeat had been detected. Example of extraneous noise of this type is that which is radiated by shavers, electric drills and auto ignitions.

To prevent the inhibiting of a stimulating pulse by extraneous noise, typical prior art demand cardiac pacers have been provided with a noise rejection circuit. In practice, this circuitry has detected the repetitive nature of the noise and blocked all inhibiting signals from the pulse generator in the presence of such noise. That is, inhibiting signals resulting from the extraneous noise and the sensing of a natural heartbeat are blocked from the pulse generator causing the pacer to revert to an asynchronous mode of operation. In the asynchronous mode, a stimulating pulse may compete with a natural potential and cause a functional irregularity in the heart. In addition, a reversion to an asynchronous operation eliminates the conservation of battery power attending the demand mode of operation.

SUMMARY OF THE INVENTION

The present invention provides a demand cardiac pacer capable of detecting natural heart activity in the presence of extraneous repetitive noise. The circuitry performing this function will also reject non-repetitive signals whose amplitude is below a predetermined value. A rectifying circuit controls the charge on a capacitor and establishes the charge at a reference level representative of sensed extraneous repetitive noise and at a second level representative of sensed heart activity. A detecting circuit responds to a difference in the reference level and second level and provides a pulse generator reset signal when that difference is greater than a predetermined value. Non-repetitive signals establishing a second level less than the predetermined value are also rejected and circuitry is provided with a refractory period to limit the repetition rate of the reset signals. In this manner, a demand cardiac pacer operating in accordance with the present invention will be inhibited by natural heart activity even when that activity is masked by the presence of extraneous repetitive noise. The inhibiting of a stimulating pulse by non-repetitive and low frequency noise is also greatly restricted by the circuit parameters which require a signal having a magnitude greater than a predetermined value to inhibit a stimulating pulse. Also a refractory period is provided to limit the frequency of reset signals to the pacer pulse generator.

DETAILED DESCRIPTION OF THE DRAWINGS

Figure 1:
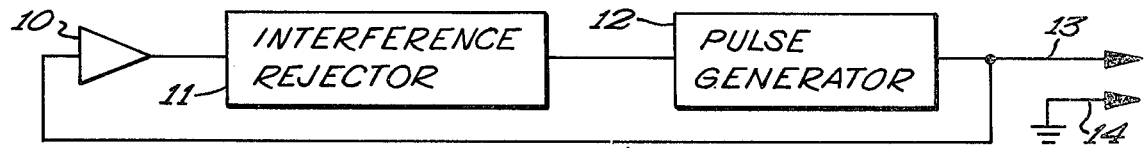
FIG. 1 is a block diagram illustrating a typical prior art demand cardiac pacer.
Figure 2:
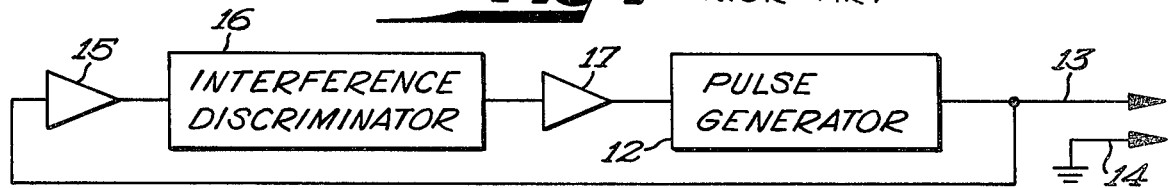
FIG. 2 is a block diagram illustrating the demand cardiac pacer of the present invention.

The present invention can best be understood with reference to FIGS. 1 and 2. FIG. 1 illustrates a typical prior art demand cardiac pacer having an amplifier 10, interference rejector 11, pulse generator 12 and suitable output devices 13 and 14 adapted for connection to the heart for the sensing of heart activity and the provision of stimulating pulses to the heart. In the absence of extraneous noise, heart activity sensed at the output devices 13 and 14 will be amplified by the amplifier 10 and passed by the interference rejector 11 as a reset signal to the pulse generator 12. Typically, all signals sensed by the output devices 13 and 14 will be amplified to a maximum value by the amplifier 10, that maximum being established by the power supply of the pacer.

As discussed above, the output devices 13 and 14 not only sense heart activity but also sense extraneous noise. These noise signals are amplified by the amplifier 10 to the same maximum level as a heart activity signal and may cause the resetting of the pulse generator 12 if not blocked by the interference rejector 11. Because all signals received by the interference rejector 11 have approximately the same amplitude, the interference rejector 11 can respond only to the repetitive nature of an amplified signal and block all signals from the pulse generator 12 in the presence of a repetitive signal. Thus, even though the signal applied to the interference rejector 11 contains a component indicative of sensed heart activity, that component will be masked by the presence of any repetitive interference and will be blocked from the pulse generator 12 by interference rejector 11. Conversely, a non-repetitive interference signal applied to the interference rejector 11 will appear as a signal indicative of sensed heart activity and will be passed by the interference rejector causing the resetting of the pulse generator 12. From this, it can be seen that a demand cardiac pacer operating in accordance with the principles illustrated in FIG. 1 will revert to an asynchronous operation in the presence of repetitive noise and may be reset by a non-repetitive noise signal even in the absence of natural heart activity. Of course, filtering techniques known to those familiar with the art may be employed in conjunction with the pacer of FIG. 1 to attempt to distinguish between heart activity and extraneous noise. However, it is exceedingly difficult to provide a filter with sufficient discrimination so as to eliminate all of the undesired effects of the extraneous noise, and particularly the effects resulting from 60 Hz signals which are commonly encountered.

FIG. 2 illustrates the operational characteristics of the demand cardiac pacer of the present invention. The pulse generator 12 and output devices 13 and 14 may be identical to those employed in the device of FIG. 1. For example, the pulse generator 12 may be of the type known to those familiar with the art having resettable timing circuitry. A common output device 13, such as an electrode, is adapted for connection to the heart for the sensing of natural heart activity and the provision of stimulating pulses from the pulse generator 12. An indifferent output device 14, such as an electrode, is also provided in known manner.

The apparatus of the present invention, as illustrated in FIG. 2, is provided with a preamplifier 15 which amplifies signals appearing at the output devices 13 and 14, whether resulting from natural heart activity or extraneous noise, only to a level sufficient to effect the switching of the various components forming the interference discriminator 16. Thus, the signals applied to the interference discriminator 16 will have a repetition rate indicative of the repetition rate of the signals sensed at the output devices 13 and 14 and an amplitude representative of the amplitude of the sensed signals. The interference discriminator responds to both the repetition rate and amplitude of the sensed signals to establish a reference level representative of repetitive signals and a second level representative of sensed heart activity. When the difference between the reference and second level is greater than a predetermined value, the interference discriminator 16 produces a pulse generator reset signal which is amplified by the amplifier 17 to the maximum value established by the pacer power source. The amplified reset signal resets the pulse generator 12 to inhibit its stimulating pulse. The interference discriminator is provided with a refractory period to limit the frequency of reset signals, for reasons known to those familiar with the art.

Figure 3:
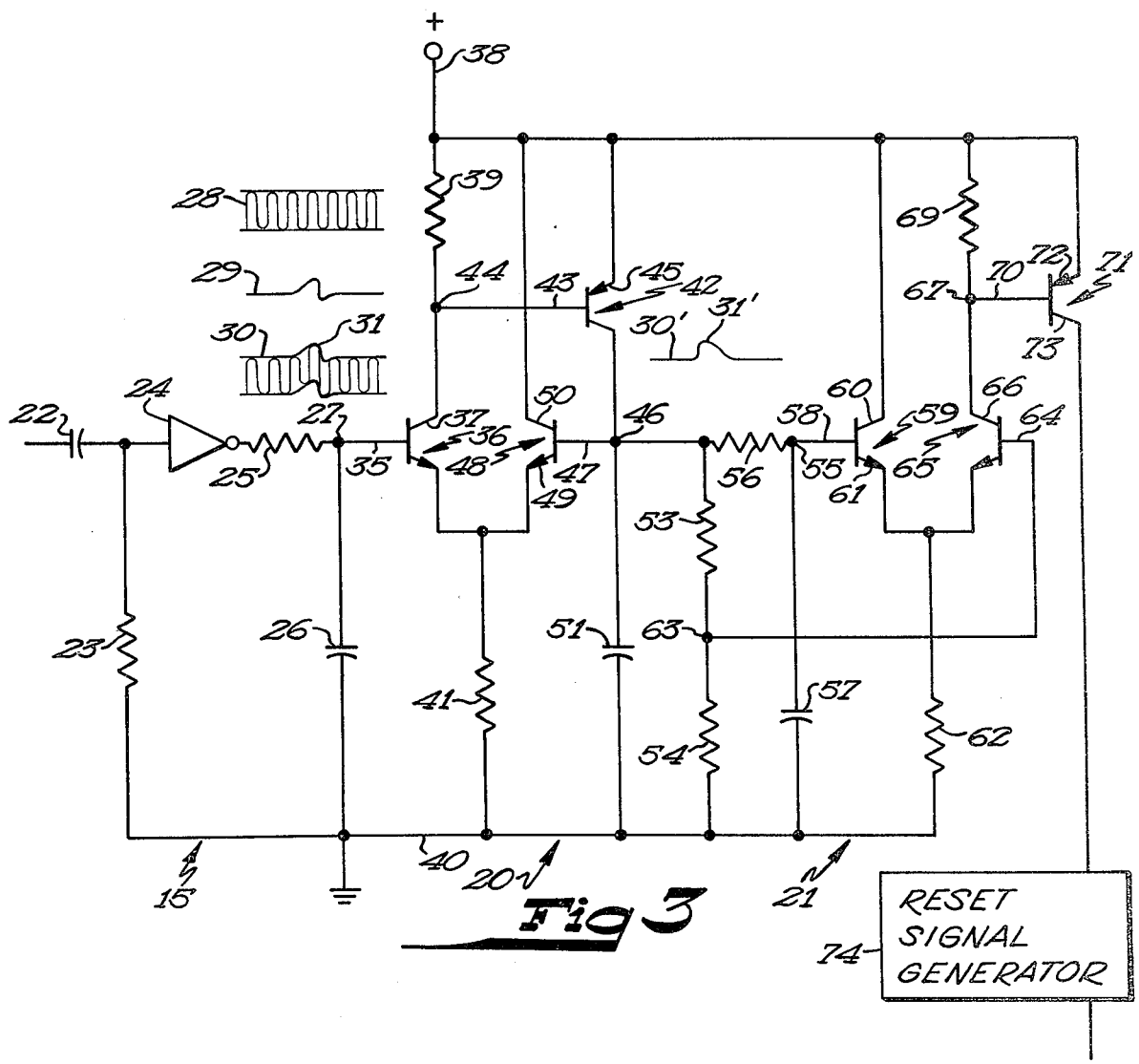
FIG. 3 is a schematic illustrating a preferred embodiment of a portion of the demand cardiac pacer of FIG. 2.

Referring now to FIG. 3 there is shown a portion of a demand cardiac pacer illustrated in FIG. 2. The portion of FIG. 2 illustrated in FIG. 3 is the amplifier portion 15 and the interference discriminator 16 composed of the rectifier portion 20 and detector portion 21. The amplifier portion 15 is composed of a high pass filter formed by capacitance 22 and resistance 23, an inverting amplifier 24 and a low pass filter formed of resistance 25 and capacitance 26. The amplifier 24 has a gain less than the amplifier 10 employed in the prior art devices (see FIG. 1) and is designed to provide signals sufficient to perform a switching function in the transistors forming the interference discriminator. That is, the signals from amplifier 24 have an amplitude less than the maximum amplitude established by the power source of the pacer. The inversion function of the amplifier 24 is intended to conform the polarity of a signal indicative of a sensed R-wave to the polarity of the transistors forming the interference discriminator of the present invention.

The high pass filter composed of capacitance 22 and resistance 23 operates as a passive differentiator for reasons to be described more fully below. Alternatively, the amplifier 24 may act as an active element differentiator, with or without the high and low pass filters. With the exception of the differentiating function performed by the high pass filter, the high and low pass filters are shown only to illustrate that the filtering techniques known to the prior art may be employed with the interference discriminator of the present invention.

With either an active or passive differentiation, the signal appearing at the junction 27 will be representative of the change with time of the amplitude of the signal sensed at the output devices 13 and 14 (see FIG. 2). This differentiating function is well known to those familiar with the art. For example, a repetitive signal applied to the output devices 13 and 14 will result in the definition of an envelope at junction 27 the envelope having the duration of the repetitive signal and an amplitude indicative of the amplitude of the repetitive signal. For illustration, signal 28 illustrates a differentiated 60 Hz repetitive signal as it appears at junction 27, the straight lines bounding the upper and lower portion of that signal serving to define the envelope. A single pulse, such as a sensed R-wave, appearing across the output devices 13 and 14 will result in a pulse signal at the junction 27. Such a pulse signal is illustrated at 29. As is well known to those familiar with the art, the appearance of a repetitive signal and a sensed R-wave across the output devices 13 and 14 will result in a signal, as illustrated at 30, at the junction 27. The signal 30 is an envelope having a duration equal to the duration of the repetitive signal and an amplitude established principally by the amplitude of the repetitive signal. A peak 31 in the amplitude of the signal 30 is a result of the concurrent differentiation of the repetitive signal and a sensed R-wave.

The junction 27 is connected to base 35 of a transistor 36. The collector 37 of transistor 36 is connected to a positive bus 38 via a resistance 39 and to a negative bus 40 via a resistance 41. A second transistor 42 has its base 43 connected to a junction 44 intermediate the resistance 39 and a collector 37 of transistor 36. The emitter junction 45 of transistor 42 is connected to the positive bus 38 and the collector is connected to a junction 46. The junction 46 is connected to the base electrode 47 of a transistor 48 whose emitter electrode 49 is connected to the negative bus via the resistance 41. The collector electrode 50 of transistor 48 is connected to the positive bus 38. A capacitance 51 connects the junction 46 to the negative bus 40.

The transistors 36 and 48 form a differential amplifier and, in combination with the transistor 42, rectify the differentiated signals appearing at the junction 27. For example, a differentiated 60 Hz signal as illustrated at 28 will sequentially turn the transistor 36 on and off. When the transistor 36 is on, the junction 44 is driven negative which turns on the transistor 42. The capacitor 51 will charge during the on time of the transistor 42 and will discharge through the resistances 53 and 54 when the transistor 42 is off. The combined resistance of the resistances 53 and 54 is selected to provide a large time constant in combination with the capacitance 51 such that the capacitance 51 will discharge very slowly during the off time of the transistor 42. Thus, the sensing of a repetitive signal at the outlet devices 13 and 14 will cause the capacitor 51 to charge to a reference level representative of the repetitive signal sensed at the outlet devices 13 and 14. For non-repetitive signals or those repetitive signals whose frequency is low enough to allow the capacitor 51 to discharge during the off time of the transistor 42, the reference level established by the capacitor 51 is zero.

When the outlet devices 13 and 14 sense a repetitive signal and heart activity, such as an R-wave, the signal illustrated at 30 having a peak 31 will appear at the junction 27. Prior to the appearance of the sensed heart activity, the capacitor 51 will charge to the reference level established by the repetitive signal. This reference level is indicated in FIG. 3 and 30'. Upon the appearance of the peak 31 at the junction 27, the capacitor 51 will charge to a second level above the reference level 30', the second level being illustrated at 31' in FIG. 3. From this it can be seen, that the rectifier portion 20 of the interference discriminator 16 will take a differentiated signal appearing at the junction 27 and transform it into a DC voltage at the junction 46, the DC voltage having a reference level representative of sensed repetitive extraneous noise and a second level representative of sensed heart activity.

The junction 46 is connected to a junction 55 by a resistance 56. The junction 55 is connected to the negative bus 40 by a capacitor 57 and to the base electrode 58 of a transistor 59. The collector electrode 60 of transistor 59 is connected to the positive bus 38 and the emitter electrode 61 is connected to the negative bus 40 via a resistance 62. The resistances 53 and 54 form a voltage divider whose intermediate junction 63 is connected to the base electrode 64 of a transistor 65. The collector electrode 66 of transistor 65 is connected to a junction 67 and the emitter is connected to the negative bus 40 via the resistance 62. The junction 67 is connected to the positive bus 38 via a resistance 69 and to the base electrode 70 of a transistor 71. The emitter junction 72 of transistor 71 is connected to the positive bus 38 and its collector electrodes 73 is connected to a reset signal generator 74.

The transistors 59 and 65 form a differential amplifier which turns on the transistor 71 when the voltage applied to the base electrode 64 of transistor 65 exceeds that applied to the base electrode 53 of transistor 59. The turn on of the transistor 71 provides a trigger signal to the reset signal generator 74 which is a monostable multivibrator having a built in refractory period. The output of the reset signal generator 74 may be amplified, as desired, to the maximum level established by the power source of the pacer with that amplified signal then serving to reset the pulse generator 12 (see FIG. 2) and inhibit the generation of a stimulating pulse across the output devices 13 and 14. During the refractory period of the reset signal generator 74 non-repetitive or low frequency signals sensed by the output connections 13 and 14 will be blocked and prevented from inhibiting the pulse generator 12. Reset signal generators having this refractory period are well known to those familiar with the art.

The signals appearing at the terminal 46 are passed to the base electrode 58 of transistor 59 via the resistance 56 and to the base electrode 64 of the transistor 64 via the resistance 53. However, the capacitor 57 acts to hold the terminal 55, and thus base electrodes 58 of transistor 59, at its previous level thus delaying the application of a voltage change at the junction 46 at the base electrode 58. When a purely repetitive signal is being sensed, the junction 46 will be at the reference level and that voltage will be applied to the base electrode 58 while a voltage lower than the reference level by a predetermined amount will be applied to the base electrode 64. In this condition, the transistor 65 will remain off. Upon the appearance of the peak 31 at junction 27, that peak will be rectified and appear as peak 31' at junction 46. This rectified peak will be applied to the base electrode 64 and delayed from the base electrode 58 by the capacitor 57. If the difference between the peak 31' and the reference level 30' is greater than the voltage drop across the resistance 53, the transistor 65 will turn on and drive the junction 67 negative. When the junction 67 goes negative, the transistor 71 will turn on and provide a trigger signal to the reset signal generator 74 thus producing a pulse generator reset signal and inhibiting a stimulating pulse from the pulse generator 12.

From the above, it can be seen that the present invention provides an interference discriminator having a rectifying portion for establishing a first voltage level representative of extraneous repetitive noise and a second voltage level representative of heart activity. The voltage levels are established by rectifying circuitry operating on differentiated sensed signals. A detecting portion responds to the rectified voltage levels and provides a trigger pulse to a reset signal generator upon the occurrence of a voltage level representative of sensed heart activity. Thus, a demand pacer operating in accordance with the present invention will continue to operate in the demand mode even in the presence of extraneous repetitive noise with the exception of noise large enough to cause the capacitor 51 to charge to the level of the line 38. In addition, non-repetitive or low-frequency noise will inhibit a stimulating pulse only when the voltage level established by the rectifying portion of the interference discriminator exceeds the reference voltage level by an amount greater than the voltage drop across the resistance 53, and then only if it results in a trigger signal outside the refractory period of the reset signal generator 74. The major benefits of the present invention are obtained by amplifying all signals sensed by the output devices 13 and 14 to a level less than the maximum established by the pacer power source and operating on the repetition rate and amplitude of those amplified signals with the interference discriminator of the present invention.

Obviously, many modifications and variations of the present invention are possible in light of the above teachings. An example of such an obvious modification is the change in polarity in the various circuit elements shown and described. Also, by altering the resistance 53 the sensitivity of the interference discriminator may be altered. That is, by making the resistance 53 larger, a larger R-wave, non-repetitive sensed noise signal or low-frequency repetitive signal will be necessary to trigger the reset signal generator 74. It has been found that the noise discriminator of the present invention can effectively reject repetitive noise signals down to approximately 5 Hz and inhibit the generation of a cardiac stimulating pulse in response to an R-wave masked by extraneous repetitive noise many times larger than the R-wave itself. It is therefore to be understood that, within the scope of the appended claims, the invention may be practiced otherwise than as specifically described.

What is claimed is:

1. In a demand cardiac pacer of the type having input and output means adapted to be connected to the heart, the input means including means for sensing natural heart activity, having a resettable pulse generator and having means for generating a pulse generator reset signal in response to the sensing of natural heart activity, the improvement which comprises:

first means connected to said heart activity sensing means for establishing a reference level representative of sensed extraneous repetitive noise and a second level, said second level being greater in absolute value than said reference level by an amount representative of sensed heart activity; and second means connected to said first means and differentially responsive to said reference level and said second level for generating a signal indicative of the sensing of heart activity when the difference between said reference level and said second level exceeds a predetermined value.

2. The apparatus of claim 1 wherein said first means comprises rectifier means.

3. The apparatus of claim 1 wherein said first means comprises:
capacitance means; and
means for charging said capacitance means to said reference level in response to extraneous repetitive noise and to said second level in response to sensed heart activity.

4. The apparatus of claim 3 wherein said capacitance means charging means comprises:
differentiator means; and
means responsive to said differentiator means for controlling the charge level of said capacitance means.

5. The apparatus of claim 4 wherein said charge controlling means comprises differential amplifier means.

6. The apparatus of claim 4 wherein said charge controlling means comprises rectifier means.

7. The apparatus of claim 1 wherein said second means comprises differential amplifier means.

8. The apparatus of claim 7 wherein said second means further comprises means responsive to said differential amplifier means for generating a signal indicative of heart activity.

9. The apparatus of claim 8 wherein said first means comprises:
capacitance means; and
means for charging said capacitance means to said reference level in response to sensed repetitive extraneous noise and to said second level in response to sensed heart activity.

10. The apparatus of claim 1 wherein said reset signal generating means comprises refractory means for limiting the repetition rate of said reset signals.

11. In a demand cardiac pacer of the type having input and output means adapted for connection to the heart, the input means including means for sensing natural heart activity, having a resettable pulse generator and having means for generating a pulse generator reset signal in response to the sensing of natural heart activity, the improvement which comprises;
differentiator means connected to said sensing means for providing a signal having an amplitude and repetition rate representative of the signals sensed by said sensing means;
capacitance means;
means connected to said differentiator means for charging said capacitance means to a first level representative of sensed repetitive extraneous noise and a second level which exceeds said first level by an amount representative of sensed heart activity; and
means connected to said capacitance charging means and differentially responsive to said first and second levels for generating a pulse generator reset signal, said reset signal generating means including refractory means for limiting the repetition rate of said reset signals.

12. The apparatus of claim 11 wherein said charging means comprises rectifier means.

13. The apparatus of claim 11 wherein said charging means and said reset signal generating means comprise differential amplifier means.

14. The apparatus of claim 11 wherein said differentiator means comprises active circuit means.

15. The apparatus of claim 11 wherein said differentiator means comprises passive circuit means.

* * * * *